Sept. 5, 1933.  J. J. CASE  1,925,949
PAPER AND TEXTILE MACHINERY
Filed May 14, 1931

INVENTOR
JOHN J. CASE
by his attorneys
Howson and Howson

Patented Sept. 5, 1933

1,925,949

UNITED STATES PATENT OFFICE 1,925,949

PAPER AND TEXTILE MACHINERY

John J. Case, Bound Brook, N. J., assignor to John Waldron Corporation, New Brunswick, N. J., a corporation of New Jersey Application May 14, 1931. Serial No. 537,405

3 Claims. (Cl. 92—75)

This invention relates to paper and textile machinery and more particularly to such machines as embosser rolls, calender rolls, press rolls, etc., and it is an object of this invention to provide improved machines of the type described which permit of readily obtaining any desired pressure on the rolls and in which desired pressures can be reproduced at will.

In the drawing—

Figure 1:
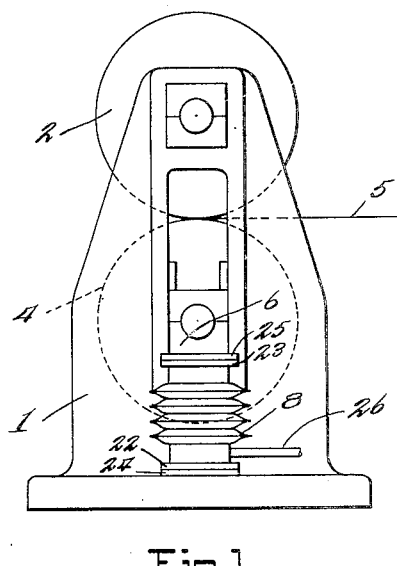
Figure 1 is a view in side elevation showing a machine constructed in accordance with this invention.

For the purpose of illustration, the invention is shown in the drawing applied to calender rolls but it is to be understood the invention is not limited to such application.

Figure 2:
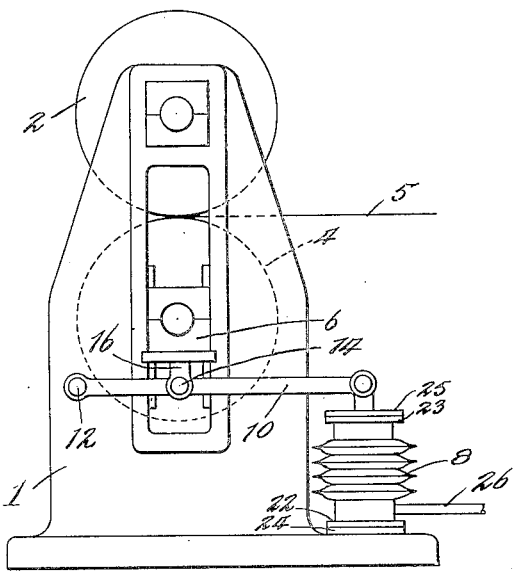
Figure 2 is a similar view of a modified construction.

The machine, as shown in Figure 1, comprises a frame 1 having a roll 2 journaled therein. Bearing against the roll 2 is a roll 4 which cooperates with the roll 2 in operating upon a web 5. The roll 4 is journaled in bearings 6 mounted on expansible hydraulic elements 8 and guided by the frame 1. While the hydraulic elements 8 are shown as directly supporting the bearings 6 for the roll 4, the elements 8 may be connected, as shown in Figure 2, to levers 10 which are pivoted, as at 12, to the machine frame 1 and support the bearings 6 for the roll 4 at 14, either by directly contacting with the bearings 6 or by means of vertical supports 16 pivotally connected to the lever 10.

Figure 3:
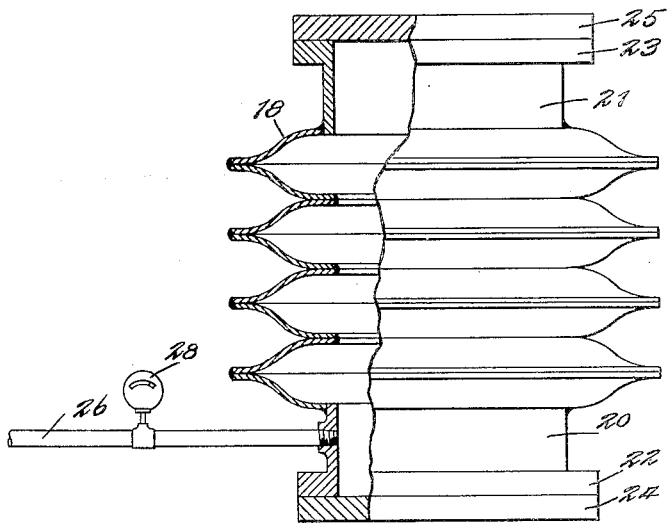
Figure 3 is a view partly in elevation and partly in section of a detail of the machine shown in Figures 1 and 2.

As shown in Figure 3, each hydraulic element 8 comprises a plurality of flexible metal rings 18 having offset inner and outer peripheries arranged in pairs with corresponding offset portions in engagement and welded together about their peripheries to form a collapsible and extensible element. To the inner peripheries of the end rings 18 are welded flanged couplings 20 and 21 to the flanges 22 and 23 of which plates 24 and 25 which seal the ends of the elements 8 are secured by welding or other suitable means. The upper closure plate 25 serves as a seat for a bearing 6 for the roll 4 or as a seat for the end of a lever 10 while the lower closure plate 24 serves as a base for the expansible element 8. The plate 24 may be of any desired dimensions in order to bolt or otherwise secure the expansible element 8 to the machine frame 1 or other suitable support.

The lower coupling 20 is provided with an opening to which is attached a pipe 26 for supplying liquid under pressure to the element 8. A gauge 28 connected to the pipe 26 indicates the pressure in the expansible element 8 and guides the operator in controlling the pressure on the rolls.

The rings 18 forming the expansible elements 8 are flexed at each operation but the rings are so proportioned that they are not flexed beyond their elastic limit or to a point where there is danger of the rings cracking.

The expansible element 8 has no parts which require packing in order to prevent leakage so that under the heaviest pressures used there is no danger of leakage from the elements 8 causing variations in the pressure on the rolls and necessitating continual watchfulness upon the part of the operator in order to produce uniform work. Eliminating the leakage also permits of using hydraulic pressure on the rolls without the objectionable working conditions which are present when there is leakage from the various hydraulic elements and this results in a much less dangerous condition about the rolls and fewer accidents. It also does away with the necessity of providing drains at each machine.

What is claimed is:—

1. In a machine of the class described, a roll, an element having plates closing opposite ends thereof, said element having a yieldable wall connecting said plates and permitting expansion and contraction of said element, means for supplying a variable fluid pressure to said element, a support for said element, means connecting one of said plates to said support, a lever for supporting said roll and means connecting said lever and the other of said plates.

2. In a machine of the class described, a roll, an element having an expansible and contractible cylindrical wall, closure plates secured to said wall at its ends and forming a chamber with said wall, a support engaging one of said closure plates, means connecting the other of said closure plates and said roll and means to supply variable fluid pressure to said chamber.

3. In a machine of the class described, a roll, an element having an expansible and contractible cylindrical wall, closure plates secured to said wall at its ends and forming a chamber with said wall, a support engaging one of said closure plates, a lever for applying pressure to said roll, means operatively connecting said lever to the other of said closure plates and means to supply variable fluid pressure to said chamber.

JOHN J. CASE.